Jan. 23, 1934.  F. J. JESCHKE  1,944,660
CYLINDER HONING TOOL OR THE LIKE
Filed April 18, 1929  2 Sheets-Sheet 2

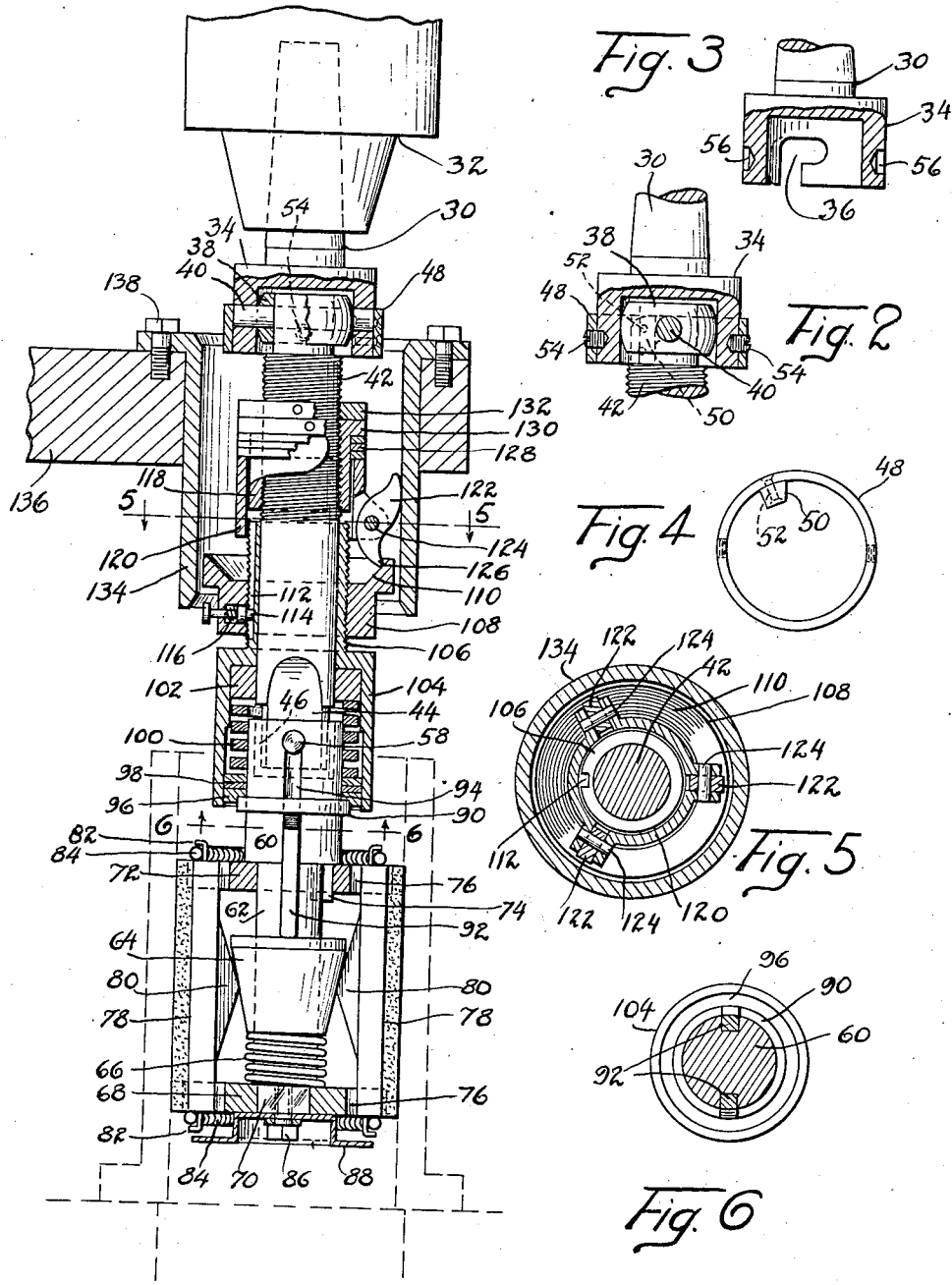

INVENTOR.
Frank J. Jeschke
BY
Parker & Burton
ATTORNEYS

Patented Jan. 23, 1934

1,944,660

UNITED STATES PATENT OFFICE 1,944,660

CYLINDER HONING TOOL OR THE LIKE

Frank J. Jeschke, Detroit, Mich., assignor to Micromatic Hone Corporation, Detroit, Mich., a corporation of Michigan Application April 18, 1929. Serial No. 356,266

33 Claims. (Cl. 51—184.3)

My invention relates to improvements in grinding tools and particularly to an improved cylinder honing tool adapted for employment in production work in finishing cylinder bores following the grinding or reaming thereof.

An object is to provide a tool which is passed through a cylinder bore primarily to remove the roughness resulting from the reaming operation, which may be set to remove a predetermined amount of material, which will run true and bore to a true diameter, which automatically feeds the grinding elements or abrasives out the desired distance to remove the predetermined amount of material, which is so constructed that the abrasives are automatically urged outwards by constantly acting yieldable means such as a caged spring, to the desired increased diameter to remove the desired amount of metal from the cylinder wall during the working operation of the tool, and which is manually adjustable to vary its automatic adjustment during operation.

The variably adjustable grinding head adjusts itself automatically during the working operation to remove the desired amount of metal from the cylinder bore, which may be one or any number of thousandths of an inch. The abrasives are urged outwards with uniform pressure brought about by a controlled tension placed upon a spring which is arranged to urge the abrasives outwards. This tension is placed on the spring automatically during the working of the tool but the amount of tension to be automatically placed thereon is predetermined and controlled as desired by a suitable adjustment. A feature of importance is the provision of means, here shown as comprising both an outer member in the form of a sleeve, encircling the tool body or spindle, and a relatively movable inner adjusting mechanism which is carried by said spindle but is spaced from a cutting head provided thereon, to render the expansion of said head dependent upon its vertical position,—said means being effective adjustably to vary the grinding diameter of the cutting head during the axial reciprocation and rotation or "working" of the tool. This sleeve serves also as an aligning sleeve to line up the tool with the bore of the cylinder to be finished.

The tool is simple in construction. It is exceedingly rapid and efficient in operation. It does not require manipulation or attention on the part of the operator during the finishing operation, being itself automatic in operation. It is easily detachable from the power driving mechanism. The abrasives cut to a true diameter and it assists materially in speeding up production work.

The above objects and others, also important and desirable, will more fully appear from the following specification, appended claims and accompanying drawings, wherein,—

Fig. 1 is a vertical sectional view through a tool embodying my invention.

Fig. 2 is a vertical sectional view through the connection of the tool body with the driving shank.

Fig. 3 is a sectional view taken on the same line as Fig. 2 through the shank.

Fig. 4 is a plan of the locking ring carried by the shank shown in Fig. 3.

Fig. 5 is a horizontal sectional view taken on line 5—5 of Fig. 1.

Fig. 6 is a horizontal sectional view taken on line 6—6 of Fig. 1.

Figure 8:
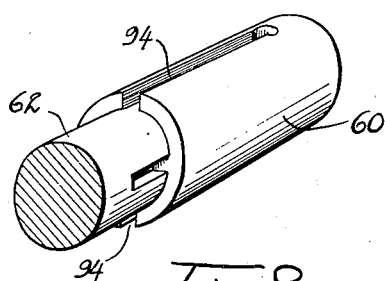
Fig. 8 is a broken away perspective of the spindle head.
Figure 9:
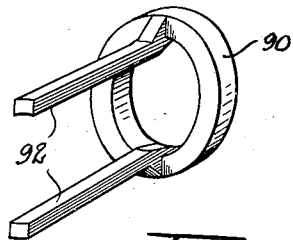
Fig. 9 is a perspective of the cone actuating collar.
Figure 7:
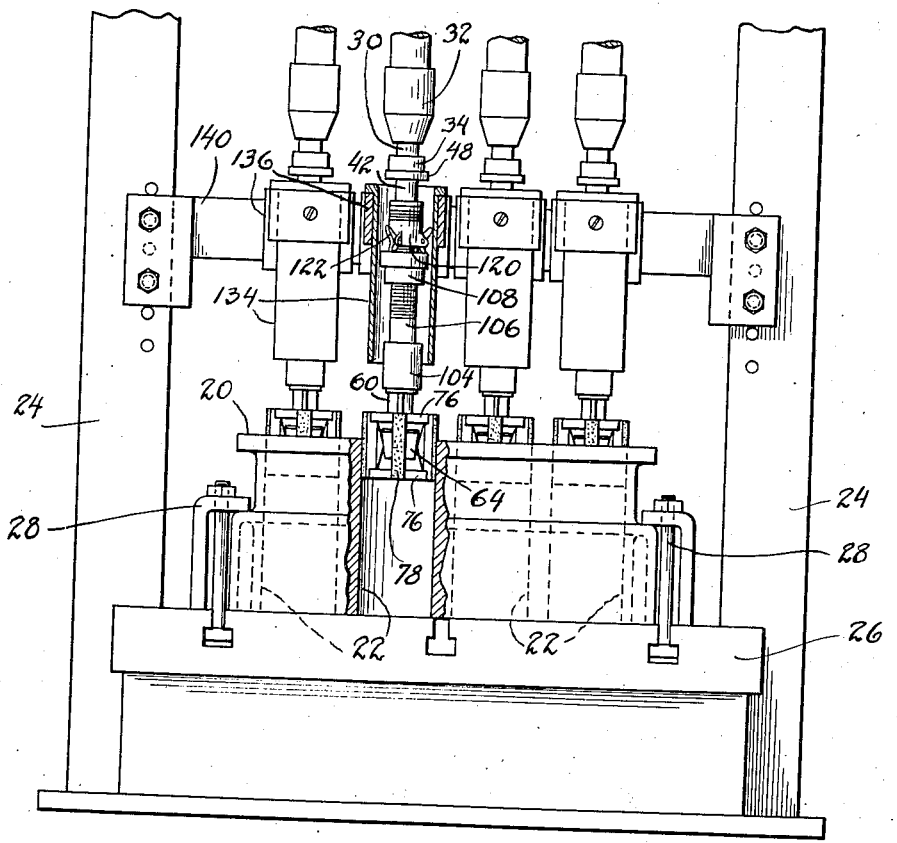
Fig. 7 is a side elevation of a machine employing a plurality of tools embodying my invention in a finishing operation upon a cylinder block.

In Fig. 7 of the drawings I have shown my improved tool in use in a finishing operation in the bore of a cylinder wherein the cylinder block is indicated as 20, and is provided with a plurality of cylinder bores 22 upon which it is desired to perform finishing operations. The machine has a frame 24 provided with a supporting bed 26 upon which the block 20 is carried and to which it is secured by suitable clamping means 28. In this machine a plurality of my improved tools are shown in use. Each tool is driven by having its shank 30 carried by a chuck 32 in the usual manner.

Each tool may comprise a shank portion 30 which has an upper head 34 provided with a bayonet joint slot 36. The illustrated upper head receives a ball 38 secured by a pin 40 to the upper end of an upper or outer section of a tool spindle. The illustrated upper spindle section comprises, below a terminal portion to which the ball 38 is secured, an intermediate portion, which is partly threaded, as at 42; and it is shown as provided at its lower end with a tang 44, received within a suitable recess 46 in the upper end of an inner head section of the spindle,—which carries a grinding head in which the abrading elements are secured.

The pin 40, to secure the ball 38 to the body of the spindle, is shown as projecting at each end beyond the ball so that its opposite ends are received within the bayonet slot 36; and they may be locked therein by means such as a locking ring 48,—which is shown as encircling the head 34 of the shank. This locking ring may have a lug 50 secured thereto by pins 52 or the like, which lug seats within the opening to the bayonet slot 36, as shown in Fig. 2, to lock the pin 40 in place so that the body of the tool spindle is driven rotatably by the shank. The ring 48 may be detachably secured to the head 34 by adjusting screws 54, shown in Fig. 2, which are received within recesses 56 in the head 34, as shown in Fig. 3. The recess 46 in the upper end of the head portion of the lower section of the tool spindle may be shaped to receive the non-circular tang 44,—so that the intermediate head is driven by the upper or body portion of the spindle; and this head is shown as secured to such body portion by a pin 58 which passes through the head portion of the spindle and the tang 44. Pins 40 and 58 being disposed substantially at right angles to one another, these two joints provide a substantially universal mounting for imparting rotation to an upper enlarged or driving head portion 60 of the inner spindle section and thereby to an expansible grinding head organization thereon.

To provide a preferred grinding head organization, the inner spindle section may include not only the mentioned upper enlarged portion 60 but also a lower portion 62, of reduced diameter, upon which is slidably supported a cone-shaped cam wedge 64. This may be substantially central and movable upwardly by resilient means such as a spring 66,—the lower end of which preferably bears against a radially slotted lower guide plate 68 for abrasive elements. The plate 68 may be mounted upon a squared end 70 of the inner section of the spindle to rotate therewith; and an upper guide plate 72 for said elements may be secured, as by a key 74, to rotate with the head portion of the inner spindle section. Each abrasive guide plate is shown as provided with guide notches or slots 76, within which the ends of the grinding elements, or appropriate shoes 78 therefor, are freely received, for collective rotation thereby.

In the illustrated embodiment, each abrasive element, or a shoe therefor, has a single and centrally enlarged or substantially wedge-shaped cam follower portion 80, adapted to cooperate with the cone or cam wedge 64. The abrasive elements are thus normally permitted a tilting movement of pressure equalization and self-alignment upon the cone 64 while being slowly advanced outwardly to a uniform radial distance by said cone; and through limitation of movement of the cone 64 the "finished" inside diameter may be predetermined. The shoes for abrasives are shown as provided at their ends with hooks 82, over which "garter" springs 84 may be so arranged as to hold said shoes and/or abrasive elements as a flexible assembly in which all parts are rotated together and the cam surfaces of said abrasive elements are kept in engagement with the wedge element 64. A screw 86 may be employed to secure a plate 88 to the lower end of the grinding head or its spindle 62, incidentally holding the slotted plate 68 in position and serving as a cover plate for the lower "garter" spring 84, or its equivalent.

In its general construction, as above described, the mounting of the abrasives as shown is generally similar to that illustrated in my pending application Serial No. 247,785; and this invention pertains primarily to accessible and reliable means for advancing and/or regulating the advance of inner means, such as the cam wedge 64, for predetermining the spacing or over-all diameter of the abrasive elements during the working operation. To accomplish this, use may be made of means including a collar 90, shown as externally and slidably received upon the enlarged portion 60 of the head of the spindle, which collar has a pair of thrust-transmitting fingers 92. These are preferably slidably received on or within slots 94 formed in the enlarged portion 60 of the inner section of the spindle; and they are shown as extending below such enlarged portion and over the reduced portion 62, to engage the upper end of the cam element 64. These fingers may slidably pass through openings in the torque-transmitting plate 72, and the upper ends of the slots 94 may be enlarged to receive the pin 58 as shown in Fig. 1,—pivotally to secure the lower or "head" section of the spindle to the upper or "body" section thereof. It will be seen that the plate 72 may rest against a shoulder formed by the enlarged portion 60 of the head,—the total length of the sectional spindle preferably remaining constant during rotation and reciprocation thereof.

To provide resiliently acting means to advance cam wedge 64, a thrust washer 96 being seated upon the collar 90 and spacer washers 98 optionally seated upon the thrust washer 96, a spring 100, shown as externally carried upon the spindle, may bear upon spacer washers 98. A movable stop 102 may seat upon the upper end of the spring 100, and a sleeve 104 surrounding the lower end of the upper section or body of the tool spindle may, as shown in Fig. 1, include an intermediate head receiving not only said stop, sliding therewith on said spindle, but also the spring 100 and any thrust washers associated therewith.

To provide a longitudinally adjustable cam device for a novel feeler organization cooperating with said stop and with some fixed element providing a master surface, the last-mentioned sleeve, acting as an intermediate thrust-transmitting element, may include or carry an upper extension 106,—upon which may be threaded a concave cam ring 108. This ring may be so formed, as shown at 110, to provide an inner bearing face for cooperation with a suitable cam finger or set of fingers. Said ring and fingers are herein shown as included in the novel "feeler" organization; and, to render the same adjustable upon a threaded portion of the sleeve extension 106, said sleeve is shown as slotted at 112 to receive an end of a latch 114, held by a spring 116. This latch provides a lock for maintaining an adjustment of the ring upon the threaded portion of the sleeve.

To complete the mentioned feeler organization, the threaded portion 42 of the upper spindle section preferably carries means which cooperate with the ring 108 to provide for expansion of the grinding head of the tool, and this means may comprise an additional sleeve 118, threaded upon the portion 42, and a collar 120, shown as fitted upon the sleeve 118. This collar may carry a plurality of operating cam fingers 122, each preferably having the form of a dog pivoted, as at 124, to the collar 120, and each having a rounded lower end 126 which rides within and bears against the cone face 110 of the cam ring 108. The upper end of the collar 120 preferably bears against spacers and/or thrust washers 128, which seat against a shoulder 130 formed on the sleeve 118; and a lock washer 132 is shown as provided to determine the position of the sleeve 118 upon the threaded portion 42 of the upper section of the spindle. The collar 120 may be fitted loosely upon the sleeve 118 so that the sleeve may overrun the collar, which minimizes the wear of the lower ends 126 of the fingers and the conical face 110 of the ring 108.

To actuate or position the fingers 122 as employed indirectly to expand and to control the expansion of the grinding head, use may be made of a stationary cam-engageable sleeve 134 providing a so-called master surface. This sleeve, naturally cylindrical when the work unit to be perfected is a cylinder, is shown as carried by a bracket 136 and as secured thereto by screws 138; and a plurality of brackets 136 may be adjustably carried by a common cross frame member 140, as shown in Fig. 1.

In the operation of the device, it will be understood that if the sleeve 134, providing a master surface of the desired type, is of a selected diameter (which will depend upon the diameter of the bore being finished) and the ring 108 is so adjusted with respect to the cam fingers 122 that, as the spindle traverses the independently supported sleeve 134, said fingers slidably contact with the master surface and pivot to ride over the conical or other cam face 110 of the ring 108, said fingers must exert a downward pressure upon such ring and so upon the stop 102,—thereby applying pressure to the spring 100. This pressure, rising to a limit depending upon the diameter of the sleeve 134 and the adjustment of collar 108 and transmitted from the spring 100 through the collar 90 and fingers 92, urges the cone member 64 or other inner cam or cams downwardly and spreads the abrasive elements outwardly. That is to say, initial guidance being provided thereby while their upper ends are divergent and the abrasive elements are contracted by springs 84, a tilting inwardly of the upper ends of the fingers 122 places a tension on the spring 100 or equivalent resilient means, as controlled by adjustment of the ring 108 and the configuration of the sleeve 134, to expand the abrasive elements, during rotation and reciprocation of the head receiving the same, to a desired limit, and thereby to remove the desired amount of material from the inwardly concave surface of any work unit,—all in conformity with the requirements of said master surface and the mentioned adjustments, including that of latch 114.

The angle formed between the conical or other cam 64 and the wedge-shaped portions 80 of the tiltable, pressure-equalizing abrasive elements is shown as such that under normal grinding conditions the abrasive elements will not respond inwardly to any slightly out-of-round or tapered condition or to portions of undue hardness in the work unit, but will automatically align and maintain themselves in general parallelism with the wall engaged thereby, and cut to a true predetermined diameter; and this construction will be seen to enable the abrasive elements (naturally straight when used to perfect a cylindrical surface, but subject to unequal wear at the ends thereof in case the work unit has a slight taper) to remove the desired amount of metal and respond automatically as the metal is removed to increase their diameter.

The ring 108 may therefore be so adjusted that the spring will be so tensioned as to urge the abrasives outwardly a given distance during a determined number of reciprocations of the grinding head of the tool through a cylinder bore.

The sleeve 130 is movable upon the threaded portion 42 of the spindle body so that the sleeve 106 may be elevated to detach the grinding head from the spindle body by removing the pin 58. The construction is such that the grinding head enters the bore to be finished before the fingers 122 come into operative contact with the sleeve 134 to urge the abrasives outwardly.

The sleeve 134 serves also to align the tool with the bore of the cylinder as well as to cooperate with the adjustment mechanism carried by the tool spindle to automatically adjust the tool during the working thereof. The ring 108 may be adjusted not only to take care of wear of the abrasives but to provide for removal of variable amounts of metal from the bore of the cylinder. Normally it would be desirable to provide sleeves 134 of different internal diameters to correspond with the diameters of the bores being finished.

I have herein referred generally to the outer section or body portion and the inner section or head portion of the spindle as together constituting a rotatable and reciprocable complete spindle of the described tool for perfecting cylinder walls, or the like; and I have referred to the adjustment mechanism as effecting changes in the limit of action of the abrasive elements; but it should be understood that all forms of this invention preferably include, in addition to the inner spindle section which carries a grinding head that is expansible to the predetermined limit and in addition to a resiliently advanced expanding means therefor, an outer section which is surrounded by means for variably predetermining the action of said expanding means,—the respective ends of said outer section being preferably connected respectively with a shank and with said inner section by joints which obviate necessity for an exactly coaxial relationship therebetween.

What I claim is:

1. A grinding tool comprising, in combination, a rotatable spindle supported for advance and withdrawal, a grinding head carried thereby provided with grinding members and means for varying the grinding diameter established by said members, a sleeve providing a master surface through which the spindle is advanced and withdrawn during the operation of the tool, means including cam fingers and intermediate parts carried by the spindle to cooperate with the sleeve upon the advance or withdrawal of the spindle therethrough to automatically vary the diameter established by said grinding members.

2. A grinding tool comprising, in combination, a rotatable spindle supported for reciprocation and provided with a grinding head of variable grinding diameter, means providing a master surface encircling the spindle and arranged to be traversed thereby during reciprocation of said spindle, grinding head adjusting mechanism carried by the spindle, and a feeler organization including movable operating fingers and intermediate parts adapted to cooperate with said means encircling the spindle and to be automatically actuated thereby to vary action of said adjusting mechanism and thereby the grinding diameter of the head.

3. A grinding tool comprising, in combination, a rotatable spindle supported for reciprocation and provided with an expansible grinding head of variable grinding diameter, an aligning sleeve 150 encircling the spindle and adapted to afford guidance therefor, adjusting mechanism carried by the spindle and coupled with the head, to vary the grinding diameter thereof, said adjusting mechanism being provided with means cooperating with the aligning sleeve during the reciprocation of the spindle therethrough to predetermine a limit of expansion of the head during operation.

4. A grinding tool comprising, in combination, a rotatable spindle supported for reciprocation and provided with a grinding head of variable grinding diameter, adjusting mechanism carried by the spindle operable to vary the grinding diameter of the head, and an aligning device comprising a sleeve arranged to be traversed by the spindle during its reciprocation to maintain the spindle in a determined position, adapted to cooperate with operating fingers for said adjusting mechanism and to actuate the same to vary the grinding diameter of the head during its operation, and operating fingers pivotally movable relatively to said spindle by said sleeve, to so actuate said adjusting mechanism.

5. A grinding tool comprising, in combination, a rotatable spindle supported for reciprocation and provided with a grinding head of variable grinding diameter, adjusting mechanism carried by the spindle including a spring adapted to be tensioned to resiliently urge said head toward an increase in its grinding diameter, means operable to place a tension on said spring, a feeler organization for said adjusting mechanism and means independently supported in proximity to the spindle to cooperate with the feeler organization of the spring tensioning means during the reciprocation of the spindle and thereby to place a tension on said spring to urge the head toward an increase in its grinding diameter, said spring tensioning means being adjustable longitudinally over the spindle to vary the tension placed on said spring said feeler organization.

6. A grinding tool comprising, in combination, a rotatable spindle supported for reciprocation, a stationary sleeve encircling the spindle, a grinding head provided with a plurality of grinding elements radially adjustable to vary the grinding diameter of the head, adjusting mechanism including a spring encircling the spindle and coupled with the grinding elements to exert a yielding pressure thereon tending to urge them radially outwardly, and cam means cooperating with the sleeve upon reciprocation of the spindle through the sleeve, to place a tension on said spring to urge the grinding elements radially outwardly, said means including a cooperating cam part adjustable over the spindle to vary the tension placed on the spring.

7. A grinding tool comprising, in combination, a rotatable spindle supported for reciprocation, a stationary sleeve providing a master surface encircling the spindle, a grinding head provided with a plurality of grinding elements radially adjustable to vary the grinding diameter of the head, adjusting mechanism including a spring encircling the spindle and coupled with the grinding elements to exert a uniform outwardly yielding pressure thereon tending to expand the grinding elements radially to increase the grinding diameter of the head, a feeler organization, cooperating with the sleeve upon the reciprocation of the spindle through the sleeve and operable to place a tension on said spring to urge said grinding elements radially outwardly, said feeler organization including a device longitudinally adjustable over the spindle to vary the tension placed on said spring and means cooperating with said device and slidably engaging the sleeve upon reciprocating of the spindle therethrough to tension said spring.

8. A grinding tool comprising, in combination, a rotatable spindle supported for reciprocation, a grinding head provided with a plurality of grinding elements radially adjustable to vary the grinding diameter of the head; means operable to vary the grinding diameter of the head including a part engaging said grinding elements and longitudinally adjustable with respect to the spindle to vary the grinding diameter established by said elements, a spring encircling the spindle and coupled with said part to exert a pressure thereon to expand the grinding elements, means operable to tension the spring during the working reciprocation of the spindle comprising a concave cam element carried by the spindle and coupled with the spring, and an operating cam element carried by the spindle having a part adapted to exert a pressure on the said concave cam element to tension said spring, said concave cam element being relatively adjustable with respect to the operating cam element.

9. In a tool for perfecting inwardly concave walls: a spindle provided with an expansible grinding head which includes expansively movable abrasive elements having inwardly disposed cam surfaces; an inner cam element which is engageable with said surfaces and slidable upon said spindle; a resilient element externally carried by said spindle; a stop therefor, movable longitudinally of said spindle; and a thrust-transmitting element, operatively connecting said resilient element and said inner cam element,—said cam surfaces and said inner cam element being so disposed as to permit said abrasive elements to so tilt as to align themselves with a wall engaged thereby.

10. In a tool for perfecting inwardly concave walls: a spindle provided with an expansible grinding head which includes expansively movable abrasive elements having inwardly disposed cam surfaces; an inner cam element which is engageable with said surfaces and slidable upon said spindle; a resilient element externally carried by said spindle; a stop therefor, movable longitudinally of said spindle; and a thrust-transmitting element, operatively connecting said resilient element and said inner cam element,—said spindle comprising an outer section and an inner section, and means for connecting the respective ends of said outer section to a shank and to said inner section so as to obviate the necessity for an exactly coaxial relationship therebetween.

11. In a tool for perfecting inwardly concave walls: a spindle provided with an expansible grinding head which includes expansively movable abrasive elements having inwardly disposed cam surfaces; an inner cam element which is engageable with said surfaces and slidable upon said spindle; a resilient element externally carried by said spindle; a stop therefor, movable longitudinally of said spindle; and a thrust-transmitting element, operatively connecting said resilient element and said inner cam element,—said spindle being externally provided with a sleeve surrounded by a master surface element, and said sleeve being provided with stop-positioning means responsive to the requirements of said master surface element.

12. In a tool for perfecting inwardly concave walls: a spindle provided with an expansible grinding head which includes expansively movable abrasive elements having inwardly disposed cam surfaces; a universal means in said spindle adjacent said head; an inner cam element which is engageable with said surfaces and slidable upon said spindle; a resilient element externally carried by said spindle; a stop therefor, movable longitudinally of said spindle; and a thrust-transmitting element, operatively connecting said resilient element and said inner cam element,—said spindle being externally provided with a sleeve carrying an intermediate head, and said stop and said resilient elements being housed within said intermediate head.

13. In a tool for perfecting inwardly concave walls: a spindle provided with an expansible grinding head which includes expansively movable abrasive elements having inwardly disposed cam surfaces; an inner cam element which is engageable with said surfaces and slidable upon said spindle; a resilient element externally carried by said spindle; a stop therefor, movable longitudinally of said spindle; a thrust-transmitting element, operatively connecting said resilient element and said inner cam element, and cam means for varying the position of said stop during a longitudinal advancement of said spindle for collapsing and expanding said abrasive elements.

14. In a tool for perfecting inwardly concave walls: a spindle provided with an expansible grinding head which includes expansively movable abrasive elements having inwardly disposed cam surfaces; an inner cam element which is engageable with said surfaces and slidable upon said spindle; a resilient element externally carried by said spindle; a stop therefor, movable longitudinally of said spindle; and a thrust-transmitting element, operatively connecting said resilient element and said inner cam element,—said spindle being surrounded by a set of finger elements on said spindle and surrounded also by a cam ring element which is engageable with said finger elements and is adjustably connected with said stop.

15. In a tool for perfecting an inwardly concave surface by rotation of an expansible grinding head relatively thereto, a spindle carrying said head; a stop movable on said spindle; resiliently advanced means, on said spindle, for expanding said head during rotation thereof and to a limit predetermined by the positioning of said stop; means providing a master surface surrounding said spindle; and means comprising both a set of fingers normally in engagement with said master surface and parts which are movable by said fingers, to vary the position of said stop on said spindle.

16. A grinding tool head organization comprising: a set of peripherally spaced abrasive elements each including a wedge-shaped cam follower portion; a cam wedge element slidable relatively to said abrasive elements; a spindle section including both a lower portion, upon which said cam wedge is slidable, and an upper portion provided with means for rotating the same; a torque-transmitting guide plate for said abrasive elements; means for imparting rotation to said guide plate from said spindle; means, slidable upon said spindle and rotatable with said guide plate, for transmitting expanding pressure to said wedge; and constantly acting yieldable means for advancing said slidable means.

17. A grinding tool head organization comprising: a set of peripherally spaced abrasive elements each including a wedge-shaped cam follower portion; a cam wedge element slidable relatively to said abrasive elements; a spindle section including both a lower portion, upon which said cam wedge is slidable, and an upper portion provided with means for rotating the same; a torque-transmitting guide plate for said abrasive elements; means for imparting rotation to said guide plate from said spindle; means, slidable upon said spindle and rotatable with said guide plate, for transmitting expanding pressure to said wedge; and constantly acting yieldable means for advancing said slidable means,—said yieldable means including a spring disposed concentrically of said spindle; and said slidable means comprising both a collar, for cooperation with said spring, and fingers extending through said plate and into engagement with said cam wedge.

18. A grinding tool head organization comprising: a set of peripherally spaced abrasive elements each including a wedge-shaped cam follower portion; a cam wedge element slidable relatively to said abrasive elements; a spindle section including a lower portion, upon which said cam wedge is slidable, an upper portion provided with means for rotating the same, and means for flexibly interconnecting said portions; a torque-transmitting guide plate for said abrasive elements; means for imparting rotation to said guide plate from said spindle; means, slidable upon said spindle and rotatable with said guide plate, for transmitting expanding pressure to said wedge; and constantly acting yieldable means for advancing said slidable means,—said yieldable means including a spring and means for predetermining the limit of its action.

19. A grinding tool head organization comprising: a set of peripherally spaced abrasive elements each including a wedge-shaped cam follower portion; a cam wedge element slidable relatively to said abrasive elements; a spindle section including both a lower portion, upon which said cam wedge is slidable, and an upper portion provided with means for rotating the same; a torque-transmitting guide plate for said abrasive elements; means for imparting rotation to said guide plate from said spindle; means, slidable upon said spindle and rotatable with said guide plate, for transmitting expanding pressure to said wedge; and constantly acting yieldable means for advancing said slidable means,—said slidable means and said wedge being disposed below the mentioned yieldable means and a spring being disposed below said wedge.

20. A grinding tool for a cylinder comprising, in combination, a rotatable spindle supported for axial reciprocation and provided with a grinding head of variable grinding diameter, adjusting mechanism carried by the spindle operative to vary the grinding diameters of the head, means interposed between said mechanism and head for effecting the collapse of the head, and means arranged in proximity to the spindle for engaging said means whereby the head is automatically collapsed before insertion and withdrawal from the cylinder and retained expanded in accordance to the adjustment of the adjusting mechanism during the grinding operation.

21. A grinding tool comprising, in combination, a rotatable spindle supported for reciprocation and provided with a grinding head of variable grinding diameter, adjustable mechanism carried by the spindle operative to vary the grinding diameter of the head, means interposed between said adjusting mechanism and said head for collapsing said head, and means arranged in proximity to the spindle to be engaged by a portion of said interposed means during the reciprocation of the tool for controlling the expansion and contraction of said head.

22. A grinding tool comprising, in combination, a rotatable spindle supported for reciprocation and provided with a grinding head of variable grinding diameter, adjusting mechanism carried by the spindle operable to vary the grinding diameter of the head, an element carried by said spindle and effective for expanding the head relative to the amount of said adjustment, biasing means for normally retaining the element in a position to have the head collapse, and means arranged in proximity to the spindle for engaging the element during the reciprocation of the tool for effecting the expansion of the head.

23. A grinding tool comprising, in combination, a rotatable spindle supported for reciprocation and provided with an expansible grinding head of variable grinding diameter, adjusting mechanism carried by the spindle, a biasing element interposed between the adjusting mechanism and said head, a collapsing mechanism for said head positioned on said spindle for rendering the adjusting mechanism ineffective, and means provided in proximity to said spindle for engaging said collapsing mechanism during reciprocation of the tool for retaining it in a position to have the head expanded relative to the adjusting mechanism.

24. A grinding tool comprising, in combination, a rotatable spindle supported for reciprocation and provided with a grinding head of variable grinding diameter, adjusting means carried by the spindle, a spring adapted to be tensioned to resiliently urge the expansion of said head, a trip mechanism for rendering said spring ineffective and for collapsing said head, and means disposed in proximity to the spindle for engaging said trip mechanism during the time the tool is reciprocated for expanding the head for rendering said spring effective in an amount relative to the adjustment of said adjusting means.

25. A grinding tool comprising, in combination, a rotatable spindle supported for reciprocation and provided with a grinding head of variable grinding diameter, adjusting mechanism carried by the spindle, a spring interposed between said mechanism and head and arranged so that a predetermined adjustment of said head is set off on said spring, means for rendering said spring ineffective for collapsing said head, and means engaging the last said means during the reciprocation of said tool for rendering said spring effective for expanding said head an amount relative to the amount set off by the adjusting mechanism on said spring.

26. A grinding tool comprising, in combination, a rotatable spindle supported for reciprocation and provided with a grinding head of variable grinding diameter, adjusting mechanism carried by the spindle operable to vary the grinding diameter of said head, means disposed between said adjusting mechanism and head for rendering the adjustment ineffective for collapsing the head, and means disposed adjacent to the tool for engaging said means during the time of the reciprocation of the tool for retaining said head expanded in accordance with the adjustment of said adjusting mechanism.

27. A honing tool for a cylinder comprising a spindle and abrasive elements which are expansible laterally thereof, adjusting means carried by said spindle for regulating the degree of expansion of said elements, means interposed between said adjusting means and said elements for controlling the expanding and the contracting of said elements, and means adjacent said spindle engageable with said controlling means for automatically effecting the collapsing of said elements before said tool is inserted within and withdrawn from said cylinder.

28. A honing tool for a cylinder having a spindle element and abrasive elements expansible laterally thereof, adjusting means mounted on said spindle for regulating the expansion of said abrasive elements, collapsible means interposed between said adjusting means and said elements for rendering the adjusting means ineffective for collapsing said elements, means adjacent said spindle for automatically rendering said collapsing means ineffective after the abrasive elements have been introduced into the cylinder to be honed to cause them to be expanded an amount proportional to the adjustment set off on the adjusting means and for rendering said collapsing means effective before the elements are withdrawn from said cylinder after the grinding operation to effect their contraction.

29. A honing tool including, in combination, an adjustable head and a plurality of abrading elements movable radially of the tool, means for radially adjusting said elements relative to said head, collapsing means on said tool for rendering said adjusting means ineffective, a support for actuating said elements, a conical member for actuating said elements radially, and means in the vicinity of said tool engageable by said collapsing means for rendering the adjusting means effective.

30. A honing tool including, in combination, an adjustable head and a plurality of abrading elements having adjacent beveled surfaces, means for radially adjusting said elements relative to said head, collapsing means on said tool for rendering said adjusting means ineffective, cams controlling the position of said collapsing means, a support for said elements, a conical member for actuating said elements radially of the tool through the engagement of said surfaces, and means engageable by said cams during the reciprocation of said tool for changing the position of said collapsing means.

31. A honing tool provided with a plurality of radially adjustable abrading elements, means for adjusting said elements, means independent of said adjusting means for expanding and contracting said element, fingers carried by said independent means, and a sleeve positioned to have the tool reciprocate therethrough for engaging and positioning said fingers and retaining said abrasive element in adjusted position during the abrading operation.

32. A honing tool including, in combination, a spindle having universal connection medially of its length, an adjustable head on the upper portion of the spindle, a spring encompassing the connection of said spindle, expansible abrading elements on the lower portion of said spindle, means for expanding said abrading elements, and means for interconnecting said head, said spring and said expanding means for regulating the expansion of said abrading elements through the adjustment of said head.

33. A honing tool including, in combination, a spindle having universal connection medially of its length, an adjustable head on the upper portion of said spindle, a spring encompassing the connection of said spindle, expansible abrading elements on the lower portion of said spindle, means to expand said elements, means for interconnecting said head, said spring and said expanding means for regulating the expansion of said abrading elements through the adjustment of said head, and camming means on said head in addition to the adjustment thereof for controlling the position of said abrading element.

FRANK J. JESCHKE.